United States Patent [19]

McIntyre et al.

[11] Patent Number: 4,872,961

[45] Date of Patent: Oct. 10, 1989

[54] CORROSION RESISTANT, LOW TEMPERATURE CURED CATHODIC ELECTRODEPOSITION COATING

[75] Inventors: John M. McIntyre; Kenneth W. Anderson; Nancy A. Rao; Richard A. Hickner, all of Lake Jackson, Tex.

[73] Assignee: The Dow Chemical Company, Midland, Mich.

[21] Appl. No.: 90,498

[22] Filed: Aug. 28, 1987

[51] Int. Cl.$^4$ .............................................. C05D 13/00
[52] U.S. Cl. ................................. 204/181.7; 524/901
[58] Field of Search ...................... 204/181.7; 524/901

[56] References Cited

U.S. PATENT DOCUMENTS

| | | | |
|---|---|---|---|
| 4,007,154 | 2/1977 | Schimmel et al. | 260/37 EP |
| 4,038,232 | 7/1977 | Bosso et al. | 260/29.6 TA |
| 4,097,352 | 6/1978 | Bosso et al. | 204/181 C |
| 4,134,864 | 1/1979 | Belanger | 523/420 |
| 4,134,865 | 1/1979 | Tominaga | 260/18 PN |
| 4,176,221 | 11/1979 | Shimp | 528/103 |
| 4,285,789 | 8/1981 | Kobayashi et al. | 204/181 C |
| 4,292,217 | 9/1981 | Spencer | 524/901 X |
| 4,310,646 | 1/1982 | Kempter et al. | 524/901 X |
| 4,575,523 | 3/1986 | Anderson et al. | 523/414 |
| 4,596,744 | 6/1986 | Anderson et al. | 428/418 |
| 4,605,690 | 8/1986 | Debry et al. | 524/901 X |
| 4,608,313 | 8/1986 | Hickner et al. | 428/414 |

FOREIGN PATENT DOCUMENTS

| | | |
|---|---|---|
| 0199663 | 10/1986 | European Pat. Off. . |
| 2121804A | 1/1984 | United Kingdom . |
| 2129808B | 7/1986 | United Kingdom . |

*Primary Examiner*—Stephen J. Kalafut

[57] ABSTRACT

Cathodic electrodepositable coating compositions comprising an aqueous dispersion of (1) at least one cationic epoxy-based resin, (2) at least one blocked isocyanate crosslinker, and (3) a solvent system containing one or more organic solvents are improved by (a) employing a blocked isocyanate crosslinker which deblocks at a temperature of less than about 160° C., and (b) employing as the solvent system, one which is substantially free of any organic solvent which will react with isocyanate groups at the temperature employed to cure said coating.

48 Claims, No Drawings

CORROSION RESISTANT, LOW TEMPERATURE CURED CATHODIC ELECTRODEPOSITION COATING

FIELD OF THE INVENTION

This invention pertains to the preparation of coating compositions containing blocked polyisocyanate or polyisocyanate prepolymers which deblock at low temperatures, non-reactive solvents and cationic epoxy-based resins and their application by cathodic electrodeposition.

BACKGROUND OF THE INVENTION

Electrodeposition has become an important method for the application of coatings over the last two decades and continues to grow in popularity because of its efficiency, uniformity and environmental acceptance. Cathodic electrodeposition has become dominant in areas where highly corrosion-resistant coatings are required, such as in primers for automobile bodies and parts. Epoxy based systems provide the best overall performance in this application and are widely used.

Cathodic electrodeposition resins based on conventional epoxies obtained by reacting liquid diglycidyl ethers of bisphenol A with bisphenol A to produce higher molecular weight epoxy resins have known disadvantages. Such products tend to have excessively high softening points resulting in poor flow out. In addition, such products require excessive amounts of solvent during their preparation. Thus, Bosso et al., U.S. Pat. No. 3,839,252, describes modification with polypropylene glycol. Marchetti et al., U.S. Pat. No. 3,947,339, teaches modification with polyester- diols or polytetramethylene glycols. Wismer et al., U.S. Pat. No. 4,419,467, describes still another modification with diols derived from cyclic polyols reacted with ethylene oxide. These various modifications, however, also have disadvantages. Tertiary amines or strong bases are required to effect the reaction between the primary alcohols and the epoxy groups involved. Furthermore, these reactions require long reaction times and are subject to gellaton because of competitive polymerization of the epoxy groups by the base catalyst. In addition epoxy resins containing low levels of chlorine are required to prevent deactivation of this catalyst.

Copending Application Serial No. 887,849, now U.S. Pat. No. 4,698,141, filed July 18, 1986 by Anderson & Hickner: co-pending application Ser. No. 887,850, now U.S. Pat. No. 4,829,104 filed July 18, 1986 by McIntyre, Rao & Hickner: co-pending application Ser. No. 911,281, now abandoned filed Sept. 24, 1986 by McIntyre: copending application Ser. No. 69,459 filed July 2, 1987; and co-pending application Ser. No. 069,475 filed July 2, 1987 describe the combination of aliphatic epoxy resins, such as the polyether diepoxides with aromatic epoxies for use in cathodic electrodeposited coatings. The resulting coatings are thicker than similar coatings not containing the aliphatic epoxides. It was discovered that these coatings were less viscous than the conventional coatings. Partial capping with monophenolic compounds reduced the average molecular weight of these resins which results in a lower viscosity resin. These resins are especially useful in the lower temperature cured coatings because they allow the deposited particles to coalesce and flow at the lower temperatures without requiring additional quantities of coalescent solvents. The use of these resins substantially reduce or may eliminate the need for the volatile organic coalescent solvents. U.S. Pat. No. 4,605,690 to Debroy et al describes the use of a soft, blocked isocyanate crosslinking agent as a reactive diluent in a cathodic electrodeposition bath which reduces the viscosity of the organic coating thus reducing or eliminating the use of coalescent solvents. Many of the coalescent solvents such as alcohols and glycols exemplified by U.S. Pat. No. 4,605,690 (col. 11, lines 9-18) would react with unblocked isocyanates thereby reblocking them, and thus substantially reducing the final crosslinked density.

Anderson et al. in U.S. Pat. Nos. 4,575,523 and 4,575,529, discloses a film-forming resin composition which when combined with a crosslinking agent and solubilized, is capable of depositing high build coatings in cathodic electrodeposition processes, with a low crosslinking temperature. Oxime blocked polyisocyanates may be used in the coatings. Anderson et al, in U.S. Pat. No. 4,596,744 teach the use of an oxime blocked isocyanate crosslinker in which the oxime blocking agents are the reaction products of acyclic aliphatic carbonyl-containing compounds having at least seven carbon atoms and a hydroxyl amine. The use of coupling solvents such as glycols and alcohols are taught in these three patents to obtain good emulsions and smooth deposited films.

Numerous U.S. Patents teach the use of blocked isocyanates as crosslinkers for film forming compositions in the cathodic electrodeposition process. In addition to the previously cited applications of Anderson et al., U.S. Pat. Nos. 3,894,922; 3,947,339; 3,984,299; 3,959,106; 4,017,438; 4,038,232; 4,031,050, 4,101,486; 4,134,816; 4,260,697; 4,297,255; 4,310,646; 4,393,179; 4,176,221; 4,182,831; 4,182,833; 4,225,478; 4,225,479; 4,339,369; 4,452,681; 4,452,930; and 4,452,963 disclose various blocked isocyanate crosslinkers which will deblock at temperatures below 160° C., such as oxime blockers. These are useful in cathodic electrodeposition formulations. Isocyanate reactive solvents are generally taught as useful in these formulations.

U.S. Pat. Nos. 3,935,087; 3,947,338; 4,007,154; 4,009,133; 4,040,924; 4,081,343; 4,134,865; and 4,134,866 teach the use of partially blocked isocyanate crosslinkers which will deblock at temperatures below 160° C. and which are reacted with base cationic resins that are useful in cathodic electrodeposition formulations. Isocyanate reactive solvents are generally taught as useful in these formulations.

The following U.S. Patents are low temperature cured cathodic electrodeposited coatings which do not cure via oxime blocked isocyanates. U.S. Pat. No. 4,435,559 teaches the use of beta-hydroxy urethane crosslinkers which are appreciably cured at 121° C. and produce excellent cures at 163° C. U.S. Pat. No. 4,440,612 discloses a coating comprising a polymeric polyol with a polyester crosslinking agent having at least two beta-alkoxyester groups per molecule which cures from about 150° C. to about 205° C. in 10 to 45 minutes. European Patent Application 0,125,577 and U.S. Pat. No. 4,610,769 describe the use of aminoplast curable cationic electrodeposition coatings which cure as low as 93° C. U.S. Pat. Nos. 4,576,980 and 4,612,098 disclose a low temperature cured cathodic electrodeposition coating which employs azetidinedione compounds as crosslinkers. These patents teach the use of various additives such as alcohols, glycols, etc. which may be used as coalescent and coupling solvents to improve the film appearance.

Blocked isocyanate can be defined as an isocyanate reaction product which is stable at room temperature but dissociates to regenerate isocyanate functionality under the influence of heat.

Many coating formulations applied by electrodeposition include pigments to provide color, opacity, application, or film properties. U.S. Pat. No. 3,936,405, Sturni et al., describes pigment grinding vehicles especially useful in preparing stable, aqueous pigment dispersions for water-dispersible coating systems, particularly for application by electrodeposition. The final electrodepositable compositions, as described, contain the pigment dispersion and an ammonium or amine salt group solubilized cationic electrodepositable epoxy-containing vehicle resin and other ingredients typically used in electrodepositable compositions.

The present invention employs a blocked urethane crosslinker which, when blended with a cathodic epoxy resin and non-reactive solvents, and dispersed in an aqueous solvent, can be used for cathodically electrodeposited coatings which are cured by baking at temperatures below 160° C. There is a need in the electrodeposition coating industry for a lower temperature cured, corrosion resistant coating. It has been determined that the described formulation produces a corrosion resistant, low temperature cured, cathodic electrodeposited coating. Not only would lower cure temperatures decrease the energy required to cure the coatings but it would allow preassembly of plastic components which normally distort due to the heat employed during curing of the coating. This could result in a savings in assembly costs.

SUMMARY OF THE INVENTION

The present invention pertains to an improvement in a cathodic electrodepositable coating composition comprising an aqueous dispersion of (1) at least one cationic epoxy-based resin, (2) at least one blocked isocyanate crosslinker, and (3) a solvent system containing one or more organic solvents: wherein the improvement resides in (a) employing a blocked isocyanate crosslinker which deblocks at a temperature of less than about 160° C., and (b) employing as the solvent system, one which is substantially free of any organic solvent which will react with isocyanate groups at the temperature employed to cure said coating.

Another aspect of the present invention pertains to an improvement in a method of coating a composition containing a blocked isocyanate crosslinker which deblocks at a temperature of less than about 160° C., a solvent system containing one or more organic solvents, and a cationic, epoxy resin-based composition onto an object having an electroconductive surface by the steps comprising (1) immersing the electroconductive object into a coating bath comprising an aqueous dispersion of cationic particles of the epoxy resin-based composition, a blocked isocyanate crosslinker and a solvent system containing one or more organic solvents:

(2) passing an electric current through said bath sufficient to electrodeposit a coating of said composition onto the object by providing a difference in electrical potential between the object and an electrode that is (a) spaced apart from said object:
(b) in electrical contact with said bath: and
(c) electrically positive in relation to said object:

wherein the improvement resides in employing (a) as the blocked isocyanate crosslinker, a blocked isocyanate crosslinker which deblocks at a temperature below about 160° C., and (b) as the organic solvent system, one which is substantially free of any organic solvent which will react with isocyanate groups at the temperature employed to cure said coating.

Another aspect of the present invention pertains to articles coated by the aforementioned method.

The composition and method of the present invention eliminates or minimizes the use of solvents which react with isocyanate groups thus preventing the reblocking of the blocked isocyanate crosslinker during cure which results in a coating, when cured, which has significantly improved corrosion resistance.

The use of lower viscosity cationic epoxy based resins, obtained by incorporation of aliphatic epoxy resins and/or partial capping of the epoxy resins to provide lower molecular weights for a given epoxy equivalent weight resin, significantly reduces the amount of coalescent and coupling solvent required in these coatings; thus, reducing the volatile organic emissions during the cure process.

DETAILED DESCRIPTION OF THE INVENTION

The improvement of the present invention is provided by the use of blocked polyisocyante crosslinkers which, when combined with solvents which do not react with isocyanates. The blocked polyisocyanate crosslinkers employed in the present invention deblock at temperatures suitably below about 160° C., more suitably between about 100° C. and 155° C.

The Blocked Prepolymer Crosslinkers

Electrodeposition formulations are generally composed of a resin onium, its counter ions, solvents, water and a crosslinking agent. Blocked isocyanates are often used as crosslinking agents via urethane crosslinking. The product of this invention consists of a blocked polyisocyanate curing agent which when combined in an electrodeposition formulation containing non-isocyanate reactive solvents provides corrosion resistant, low temperature cured (below 160° C.) coatings. The crosslinker is produced by reacting the free isocyanate groups with a suitable blocking agent. Polyisocyanates, diisocyanates, triisocyanates, etc., as well as isocyanate containing prepolymers may be employed in this invention. The following formula is given as an example of a suitable isocyanate-containing prepolymer prepared from a diisocyanate and a polyether diol prior to being blocked.

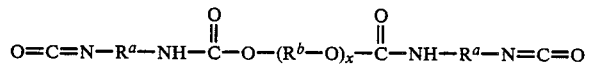

where $R^a$ and $R^b$ are organic constituents and x can vary from 3 to about 25. The $R^a$ groups are derived from the diisocyanate whereas the $R^b$ groups are derived from the polyether diol. Suitable ketoxime blocking agents can be represented by the following formula:

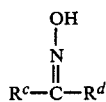

where $R^c$ and $R^d$ are organic substituents. Preferably $R^c$ and $R^d$ are lower alkyl groups such as, for example, methyl, ethyl, propyl, butyl and the like. Particularly suitable oximes include, for example, acetone oxime, methyl ethyl ketoxime, cyclohexanone oxime, combinations thereof and the like. The blocked crosslinking agent when blocked with an oxime can be represented by the following formula:

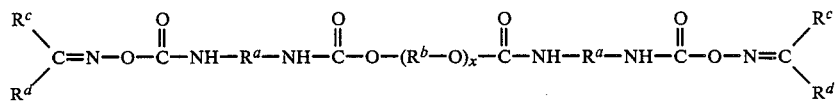

where $R^a$, $R^b$, and x are as defined above and $R^c$ and $R^d$ are an organic substituent derived from an oxime employed as the blocking agent.

The crosslinker can also consist of blends of a blocked isocyanate and a blocked isocyanate-containing prepolymer. For example, the crosslinker can be a blend of toluene diisocyanate and a toluene diisocyanate/polyether diol prepolymer, blocked with acetone oxime. This crosslinker is a mixture of the products represented by the following formulas:

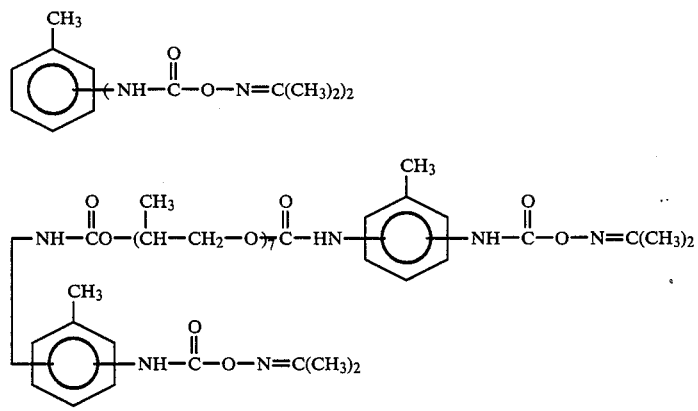

Suitable polyisocyanates which can be employed to prepare the isocyanate-containing prepolymer include, for example those described by Bosso, et al in U.S. Pat. No. 3,959,106 which is incorporated herein by reference. Particularly suitable polyisocyanates include, for example, toluene diisocyanate, diphenylmethane diisocyanate, isophorone diisocyanate, hexamethylene diisocyanate, hydrogenated diphenylmethane diisocyanate, the isocyanurate trimer of hexamethylenediisocyanate, combinations thereof and the like.

Also suitable are isocyanate-functional prepolymers derived from polyisocyanates and polyols using excess isocyanate groups. Examples of suitable prepolymers are described by Bosso, et al., in U.S. Pat. No. 3,959,106, Column 15, lines 25–57, incorporated herein by reference. In the preparation of the prepolymers, reactant functionality, equivalent ratios, and methods of contacting the reactants must be chosen in accordance with considerations known in the art to provide ungelled products having the desired functionality and equivalent weight.

Blocked isocyanates of use in this invention release the blocking group, which usually volatilize from the coating, below about 160° C., usually between temperatures of 100° C. and 155° C. resulting in isocyanate functionality which can react with other active hydrogen-containing compounds to form more thermally stable urethane and urea crosslinkers. Blocked isocyanates have been reviewed extensively by Z. W. Wicks, Jr. in "Progress in Organic Coatings", pp. 73–99, vol. 3, 1975 and pp. 3–28, vol. 9, 1981. Numerous suitable blocked isocyanates are described in these articles which are incorporated herein by reference. Oxime blocked isocyanates are reported to be suitable crosslinkers which provide cures between 100° C. and 155° C. Examples of suitable blocking agents include, for example, benzyl methacrylohydroxamate, acetone oxime, cyclohexanone oxime, 2-butanone oxime (methyl ethyl ketoxime), N,N-diethyl hydroxylamine, 3-hydroxy pyridine, 8-hydroxy quinoline, 8-hydroxy quinaldine, phloroglucinol, ethyl acetoacetate, diethyl malonate, and ε-caprolactam. J. W. Rosthauser and J. L. Williams in "Modern Paint and Coatings", p. 78, Feb. 1985 note that blocked isocyanates based on aromatic polyisocyanates dissociate at lower temperatures than those based on aliphatics and that dissociation temperatures of blocked isocyanates based on commercially utilized blocking agents decrease in the order: alcohols > ε-caprolactam > phenols > methyl ethyl ketoxime > active methylene compounds. The temperature at which a blocked isocyanate will produce crosslinkers can be determined by the methods disclosed by T. Anagnostou and E. Jaul, "Journal of Coatings Technology", p. 35, vol. 53, Feb. 1981: P. Kordomenos, et al., "Journal of Coatings Technology", p.43, vol.54, April 1982: or G. M. Carlson et al., "Advances in Urethane Science and Technology", vol. 9, p.47, Edited by K. C. Frisch and D. Klemphen: all of which are incorporated herein by reference. Two other conventional methods for determining if coatings are cured are solvent resistance via a double rub technique described by Cavitt in U.S. Pat. No. 4,404,335 and pencil hardness described in ASTM D3363-74, "Standard Test Method: Method for Film Hardness by Pencil Test" which are among the more specific examples of suitable epoxy-based resins. Useful glycidyl ethers of dihydric phenols include those represented by the formulas:

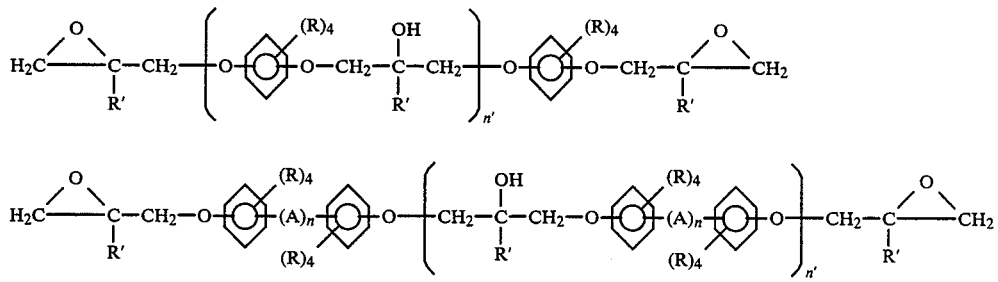

incorporated herein by reference.

Particularly suitable blocking agents for the polyisocyanate blocking agents are the oximes. Most particularly suitable blocking agents include, for example, oximes of ketones, also known as ketoximes, due to their tendency to deblock at relatively lower temperatures and provide a coating composition which can be cured at significantly lower temperatures. The blocking agent is employed in amounts which provide enough blocking agent to react with (block) substantially all of the isocyanate groups contained in the isocyanate-containing crosslinker.

The blocked isocyanate is suitably employed in quantities which provide from about 0.2 to about 1.2, more suitably from about 0.3 to about 1, most suitably from about 0.4 to about 0.8 blocked isocyanate groups per reactive hydroxyl group and/or amine hydrogen atom contained in the cathodic epoxy resin.

The blocked crosslinker can be prepared by reacting the oxime with the isocyanate. The reactions are typically conducted in an inert atmosphere such as nitrogen at temperatures between about 25° C. and about 100° C., more suitably below 70° C. so as to control the exothermic reaction. Solvents compatible with the reactants, product and the coating composition can be employed such as, for example, ketones, esters, ethers, or hydrocarbons.

The blocked isocyanate can be prepared by reacting the polyisocyanate with the blocking agent in the presence of a suitable catalyst such as a metal carboxylate such as, for example, dibutyltin dilaurate.

The Cathodic Electrodeposition Resin

The preferred class of electrodepositable resins are the epoxy-based resins, particularly those resins containing a glycidyl ether of a dihydric phenol which has been advanced with a dihydric phenol such as bisphenol A. Conventional epoxy resins obtained by reacting liquid glycidyl ethers of bisphenol A with bisphenol A are wherein each A is independently a divalent hydrocarbon group having suitably from 1 to about 12, more suitably from 1 to about 6, carbon atoms, —S—, —S—S—, —SO—, —SO$_2$—, —SO—, —O—CO—O—, or —O—; each R is independently hydrogen, a hydrocarbyl or hydrocarbyloxy group having from 1 to about 4 carbon atoms, or a halogen, preferably chlorine or bromine: each R' is independently hydrogen or an alkyl group having from 1 to about 3 carbon atoms: n has a value from zero to 1: and n' has a value suitably from zero to about 40, more suitably from 0.1 to about 5.

The term hydrocarbyl as employed herein includes, alkyl, cycloalkyl, aryl, aralkyl, alkaryl, alkenyl and the like. Likewise, the term hydrocarbyloxy as employed herein includes, alkyloxy, cycloalkyloxy, aryloxy, aralkyloxy, alkaryloxy, alkenyloxy and the like.

Polyphenols useful for the production of these polyepoxides include, for example, 2,2-bis(4-hydroxyphenyl)-propane (bisphenol A), 1,1-bis(4hydroxyphenyl)ethane, bis(4-hydroxyphenyl)methane (bisphenol F), p, p'-hydroxybiphenol, resorcinol, hydroquinone or the like. The particularly preferred polyglycidyl ethers of polyphenols are the diglycidyl ether of bisphenol A and the oligomeric polyglycidyl ethers of bisphenol A.

A particularly preferred cathodic electrodeposition resin is obtained by substituting glycidyl ethers of polyetherpolyols or glycidyl ethers of other compounds having a plurality of aliphatic hydroxyl groups for a portion of the aromatic glycidyl ethers listed above.

The glycidyl ethers of polyetherpolyols and aliphatic compounds having a plurality of aliphatic hydroxyl groups useful in preparation of these epoxy resins are those having the structure:

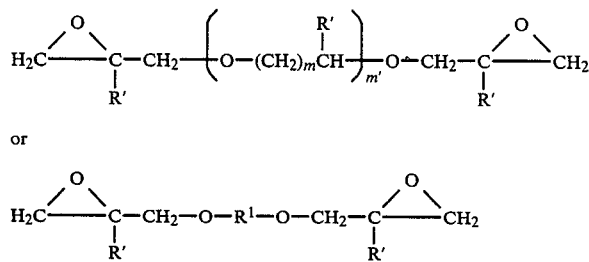

wherein each R' is hydrogen or an alkyl group having from 1 to about 3 carbon atoms; R$^1$ is a divalent aliphatic hydrocarbon group having suitably from about 2 to about 20, more suitably from about 2 to about 12, carbon atoms: m has a value from about 1 to about 3:

and m' suitably has a value from about 2 to about 40, more suitably from about 2 to about 20.

The glycidyl ethers of polyetherpolyols and aliphatic diols are produced by the condensation of an epihalohydrin with a polyetherpolyol or aliphatic polyol having the structure:

$$H-(O-X)_y OH$$

wherein X is a group represent by the formula $$-(CH_2)_{y'}\overset{R^2}{\underset{|}{CH}}-$$

$R^2$ is hydrogen or an alkyl group having from 1 to about 6 carbon atoms: y has an average value of from 1 to about 40 and y' has a value of from 1 to about 6.

The polyetherpolyols can be produced by the polymerization of the appropriate alkylene oxide or of mixtures of various alkylene oxides to produce a chain having the desired R groups distributed among the units. Examples of useful polyetherpolyols are diethylene glycol, triethylene glycol, poly(ethylene glycol), dipropylene glycol, tripropylene glycol, poly(propylene glycol), di-1,2-butylene glycol, poly(1,2-butyleneoxide), poly(1,4-butanediol), and the like. The particularly preferred polyetherpolyols from which the diglycidyl ethers are derived are poly(propylene glycol) in which the average value of m' is between about 2 and 20.

Some of the common methods of synthesis of the diglycidylethers of polyetherpolyols and aliphatic polyols produce significant amounts of organic chloride-containing impurities. However, other processes are known for preparing products with lower levels of such impurities. While the low-chloride resins are not required for the practice of this invention, they may be used, if desired, for possible improvements in the process of preparing the resins, in the storage properties of the resins or formulated coatings made therefrom or in the performance properties of the products.

A most preferred cationic electrodeposition resin is obtained by the use of capping agents such as monofunctional phenolic compounds which provides the advantageous ability to reduce the viscosities of the resulting product without chain-extension reactions and thus allows independent control of the average molecular weight and the epoxide content of the resulting resin within certain limits. Use of a monofunctional compound to terminate a certain portion of the resin chain ends also reduces the average epoxy functionality of the reaction product. The monofunctional phenolic compound is typically used at levels of from zero to about 0.7 equivalent of phenolic hydroxyl groups per equivalent of epoxy remaining after reaction of the diphenolic component.

Examples of useful monofunctional capping agents are monofunctional phenolic compounds such as phenol, tertiary-butyl phenol, cresol, para-nonyl phenol, higher alkyl substituted phenols, and the like. Particularly preferred is para-nonyl phenol. The number of phenolic groups are chosen so that there will be a stoichiometric excess of epoxide groups. Ratios are chosen so that the resulting product will contain the desired concentration of terminal epoxy groups and the desired concentration of resin chain ends terminated by the monophenolic compound after substantially all of the phenolic groups are consumed by reaction with epoxy groups. Usually, the amount of the capping agent is from about 1 percent to about 15 percent based on the total weight of the components.

These amounts are dependent on the respective equivalent weights of the reactants and the relative amounts of the epoxy-functional components and may be calculated by methods known in the art. In the practice of this invention, the desired epoxide content of the reaction product useful for preparation of the cationic resin is typically between 1 and 5 percent, calculated as the weight percentage of oxirane groups, and preferably is from about 2 to about 4 percent. These levels are preferred because they provide, after conversion, the desired cationic charge density in the resinous products useful in cathodic electrodeposition. These cationic resins are produced by conversion of part or all of the epoxy groups to cationic groups as described below.

Reactions of the monofunctional capping agent with the polyepoxide to produce the desired epoxy resins are typically conducted by mixing the components and heating, usually in the presence of a suitable catalyst, to temperatures between about 130° C. and about 225° C., preferably between about 150° C. and about 200° C., until the desired epoxide content of the product is reached. The reaction optionally may be conducted in an appropriate solvent to reduce the viscosity, facilitate mixing and handling, and assist in controlling the heat of reaction.

Many useful catalysts for the desired reactions are known in the art. Examples of suitable catalysts include ethyltriphenylphosphonium acetate.acetic acid complex, ethyltriphenylphosphonium chloride, bromide, iodide, or phosphate, and tetrabutylphosphonium acetate.acetic acid complex. The catalysts are typically used at levels of 0.01 to 0.5 mole percent of the epoxide groups.

Several kinds of epoxy-based resins which can be used are described in various patents as follows: Jerabek in U.S. Pat. No. 4,031,050 describes cationic electrodeposition resins which are the reaction products of an epoxy-based resin and primary or secondary amines. U.S. Pat. No. 4,017,438 to Jerabek et al. describes reaction products of epoxy-based resins and blocked primary amines. Bosso et al. describe in U.S. Pat. Nos. 3,962,165; 3,975,346; 4,001,101 and 4,101,486 cationic electrodeposition resins which are reaction products of an epoxy-based resin and tertiary amines. Bosso et al. in U.S. Pat. 3,959,106 and DeBona in U.S. Pat. 3,793,278 describe cationic electrodeposition resins which are epoxy-based resins having sulfonium salt groups. Wessling et al. in U.S. Pat. No. 4,383,073 describes cationic electrodeposition resins which are epoxy-based resins having carbamoylpyridinium salt groups. U.S. Pat. No. 4,419,467 to Bosso et al. discusses epoxy-based resins reacted with primary, secondary and tertiary amine groups as well as quarternary ammonium groups and ternary sulfonium groups. U.S. Pat. No. 4,076,676 to Sommerfeld describes aqueous dispersions of epoxybased cationic resins which are the reaction products of a terminally functional epoxy resin, a tertiary amine and a nitrogen resin. U.S. Pat. No. 4,134,864, to Belanger, describes reaction products of epoxy-based resins, polyamines and a capping agent. Still other suitable resins for use in the blends of this invention are described in the patents in the following list:

| U.S. Pat. No. | Patentee |
| --- | --- |
| 4,182,831 | Hicks |
| 4,190,564 | Tominaga et al. |
| 4,296,010 | Tominaga |
| 4,335,028 | Ting et al. |
| 4,339,369 | Hicks et al. | all of which are incorporated herein by reference.

Also suitable as the epoxy-based resin in the present invention are any of the aforementioned epoxy resins which have been partially capped with the aforementioned capping agents. The amount of the capping agent is from about zero to about 0.7 equivalent per epoxide equivalent remaining after reaction of the diphenolic component.

Appropriate solvents include non-isocyanate reactive solvents, such as, aromatic and aliphatic hydrocarbon solvents, glycol ether esters, esters, ketones, ethers, or mixtures of such solvents. Preferred solvents are hydrocarbons and/or ketones. Most preferred solvents are xylene and cyclohexanone. Solvent content should be minimized to reduce organic emission during the cure cycle. The content can range from zero to about 30 percent of the reaction mixture. A solvent is usually chosen which is compatible with the subsequent cation-forming reactions and with the final coating composition so that the solvent does not require subsequent removal.

The nucleophilic compounds which are used advantageously in forming the cations required by this invention are represented by the following classes of compounds, sometimes called Lewis bases:

(a) monobasic heteroaromatic nitrogen compounds,
(b) tetra (lower alkyl)thioureas,
(c) $R^3$-S-$R^4$ wherein $R^3$ and $R^4$ individually are lower alkyl, hydroxy lower alkyl or wherein $R^3$ and $R^4$ are combined as one alkylene radical having 3 to 5 carbon atoms
(d)

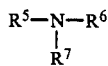

wherein $R^6$ and $R^7$ individually are lower alkyl, hydroxy lower alkyl, a

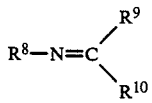

group or $R^5$ and $R^6$ are combined as one alkylene radical having from 3 to 5 carbon atoms, $R^8$ is an alkylene group having from 2 to 10 carbon atoms, $R^9$ and $R^{10}$ individually are lower alkyl and $R^5$ is hydrogen or lower alkyl, aralkyl or aryl, except that when $R^6$ and $R^7$ together are an alkylene group then $R^5$ is hydrogen, lower alkyl or hydroxyalkyl and when either or both of $R^6$ and $R^7$ is

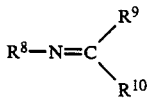

then $R^5$ is hydrogen, (e)

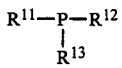

wherein $R^{11}$, $R^{12}$ and $R^{13}$ individually are lower alkyl, hydroxy lower alkyl or aryl.

In this specification the term lower alkyl means an alkyl having from 1 to about 6 carbon atoms such as methyl, ethyl, propyl, isopropyl, n-butyl, isobutyl, n-pentyl, isopentyl, n-hexyl and isohexyl.

Representative specific nucleophilic compounds are pyridine, nicotinamide, quinoline, isoquinoline, tetramethyl thiourea, tetraethyl thiourea, hydroxyethylmethyl sulfide, hydroxyethylethyl sulfide, dimethyl sulfide, diethyl sulfide, di-n-propyl sulfide, methyl-n-propyl sulfide, methylbutyl sulfide, dibutyl sulfide, dihydroxyethyl sulfide, bis-hydroxybutyl sulfide, trimethylene sulfide, thiacyclohexane, tetrahydrothiophene, dimethyl amine, diethyl amine, dibutyl amine, N-methylethanolamine, diethanolamine and the ketimine derivatives of polyamines containing secondary and primary amino groups such as those produced by the reaction of diethylene triamine or N-aminoethylpiperazine with acetone, methyl ethyl ketone or methyl isobutyl ketone: N-methylpiperidine, N-ethylpyrrolidine, N-hydroxyethylpyrrolidine, trimethylphosphine, triethylphosphine, tri-n-butylphosphine, trimethylamine, triethylamine, tri-n-propylamine, tri-isobutylamine, hydroxyethyldimethylamine, butyldimethylamine, trishydroxyethylamine, triphenylphosphine, and N,N,N-dimethylphenethylamine.

Substantially any organic acid, especially a carboxylic acid, can be used in the conversion reaction to form onium salts so long as the acid is sufficiently strong to promote the reaction between the nucleophile and the vicinal epoxide group(s) on the resinous reactant. In the case of the salts formed by addition of acid to a secondary amine/epoxy resin reaction product, the acid should be sufficiently strong to protonate the resultant tertiary amine product to the extent desired.

Monobasic acids are normally preferred ($H^{\oplus}A^{\ominus}$). Suitable organic acids include, for example, alkanoic acids having from 1 to 4 carbon atoms (e.g., acetic acid, propionic acid, etc.), alkenoic acids having up to 5 carbon atoms (e.g., acrylic acid, methacrylic acid, etc.) hydroxy-functional carboxylic acids (e.g., glycolic acid, lactic acid, etc.) and organic sulfonic acids (e.g., methanesulfonic acid), and the like. Presently preferred acid are lower alkanoic acids of 1 to 4 carbon atoms with lactic acid and acetic acid being most preferred. The anion can be exchanged, of course, by conventional anion exchange techniques. See, for example, U.S. Pat. No. 3,959,106 at column 19. Suitable anions are chloride, bromide, bisulfate, bicarbonate, nitrate, dihydrogen phosphate, lactate and alkanoates of 1–4 carbon atoms. Acetate and lactate are the most preferred anions.

The conversion reaction to cationic resins is normally conducted by merely blending the reactants together and maintaining the reaction mixture at an elevated temperature until the reaction is complete or substantially complete. The progress of the reaction is easily monitored. The reaction is normally conducted with stirring and is normally conducted under an atmosphere of inert gas (e.g., nitrogen). Satisfactory reaction rates occur at temperatures of from about 25° C. to about 100° C., with preferred reaction rates being observed at temperatures from about 60° C. to about 80° C.

Good results can be achieved by using substantially stoichiometric amounts of reactants although a slight excess or deficiency of the epoxycontaining resin or the nucleophile can be used. With weak acids, useful ratios of the reactants range from 0.5 to 1.0 equivalent of nucleophile per epoxide group of the resin and 0.6 to 1.1 equivalents of acid per epoxide. These ratios, when combined with the preferred epoxide content resins described above, provide the desired range of cationic charge density required to produce a stable dispersion of the coating composition in water. With still weaker acids (e.g., a carboxylic acid, such as acetic acid) a slight excess of acid is preferred to maximize the yield of onium salts. In preparing the compositions in which the cationic group being formed is an onium group, the acid should be present during the reaction of the nucleophile and the epoxy group of the resin. When the nucleophile is a secondary amine, the amine-epoxy reaction can be conducted first, followed by addition of the acid to form the salt and thus produce the cationic form of the resin.

For the onium-forming reactions, the amount of water that is also included in the reaction mixture can be varied to convenience so long as there is sufficient acid and water present to stabilize the cationic salt formed during the course of the reaction. Normally, it has been found preferable to include water in the reaction in amounts of from about 5 to about 30 moles per epoxy equivalent. When the nucleophile is a secondary amine, the water can be added before, during, or after the resin epoxy group/nucleophile reaction. The preferred range of charge density of the cationic, advanced epoxy resin is from about 0.2 to about 0.6 milliequivalent of charge per gram of the resin. The charge density can be determined by the method taught by Wismer et al. in U.S. Pat. No. 4,191,674 which is incorporated herein by reference.

OTHER EMBODIMENTS OF THE INVENTION

A catalyst optionally may be included in the coating composition to provide faster or more complete curing of the coating. Suitable catalysts for the various classes of crosslinking agents are known to those skilled in the art. For the coating compositions, suitable catalysts include dibutyl tin dilaurate, dibutyl tin diacetate, dibutyl tin oxide, stannous octanoate, and other urethane-forming catalysts known in the art. The preferred catalyst is dibutyl tin dilaurate. Amounts used typically range between about 0.1 and about 3 weight percent of binder solids.

Unpigmented coating compositions are prepared by mixing the cationic resin blend with the cross-linking agent and optionally any additives such as catalysts, solvents, surfactants, flow modifiers, defoamers, or other additives. These additives should be carefully selected in order to minimize introduction of isocyanate reactive components. This mixture is then dispersed in water by any of the known methods. A particularly preferred method is the technique known as phase-inversion emulsification, wherein water is slowly added with agitation to the above mixture, usually at temperatures ranging from ambient to 90° C., until the phases invert to form an organic phase-in-water dispersion. The solids content of the aqueous dispersion is usually between about 5 and about 30 percent by weight and preferably between about 10 and about 25 percent by weight for application by electrodeposition.

Pigmented coating compositions are prepared by adding a concentrated dispersion of pigments and extenders to the unpigmented coating compositions. This pigment dispersion is prepared by grinding the pigments together with a suitable pigment grinding vehicle in a suitable mill as known in the art.

Pigments and extenders known in the art are suitable for use in these coatings including pigments which increase the corrosion resistance of the coatings. Examples of useful pigments or extenders include titanium dioxide, talc, clay, lead oxide, lead silicates, lead chromates, carbon black, strontium chromate, and barium sulfate.

Pigment grinding vehicles are known in the art. A preferred pigment grinding vehicle for use in this invention consists of a water-soluble cationic resinous product, water, and a minor amount of non-isocyanate reactive solvent. The cationic resinous product is prepared by reacting an epichlorohydrin/bisphenol A condensation product having an epoxide group content of about 8 percent with a nucleophile, an acid, and water in a similar fashion as described above for the cationic resins used in the preferred embodiment of the invention. The water-soluble product may be diluted with water to form a clear solution useful as a pigment grinding vehicle.

The pH and/or conductivity of the coating compositions may be adjusted to desired levels by the addition of compatible acids, bases, and/or electrolytes known in the art. Other additives such as solvents, surfactants, defoamers, anti-oxidants, bactericides, etc. may also be added to modify or optimize properties of the compositions or the coating in accordance with practices known to those skilled in the art. These additives should be carefully selected to minimize or eliminate the use of isocyanate components.

Although the coating compositions of the invention can be applied by any conventional technique for aqueous coatings, they are particularly useful for application by cathodic electrodeposition, wherein the article to be coated is immersed in the coating composition and made the cathode, with a suitable anode in contact with the coating composition. When sufficient voltage is applied, a film of the coating deposits on the cathode and adheres. Voltage may range from 10 to 1,000 volts, typically 50 to 500. The film thickness achieved generally increases with increasing voltage. Current is allowed to flow for between a few seconds to several minutes, typically two minutes, over which time the current usually decreases. Any electrically conductive substrate may be coated in this fashion, especially metals such as steel and aluminum. Other aspects of the electrodeposition process, such as bath maintenance, are conventional. After deposition, the article is removed from the bath and typically rinsed with water to remove that coating composition which does not adhere. The uncured coating film on the article is cured by heating at elevated temperatures, below about 160° C., preferably ranging from about 100° C. to about 155° C., for periods of about 1 to about 60 minutes.

EXAMPLE 1

A. Preparation of Polyurethane Crosslinkers

Into an agitated closed reaction vessel equipped with temperature control means and a means for providing a nitrogen atmosphere, are charged 696 grams of toluene diisocyanate and dibutyl tin dilaurate catalyst in an amount sufficient to provide 2.8 grams of dibutyl tin dilaurate catalyst. To the mixture of diisocyanate and catalyst is slowly added 425 grams of polyether polyol (a polyoxypropylene glycol having a number average molecular weight of 425, commercially available from The Dow Chemical Company as polyglycol P425) while maintaining the temperature below 60° C. Upon completion of the polyol addition, 522 grams of the blocking agent (methyl ethyl ketoxime) is slowly added while maintaining the temperature below 60° C. Upon completion of the addition of the blocking agent, the temperature is maintained below 60° C. for one hour. No detectable free isocyanate is detected by infrared spectrophotometric analysis.

B. Preparation of Cationic Electrodeposition Resin Dispersions

Into a closed, agitated reaction vessel are charged 150 grams of a diglycidyl ether of a polyoxypropylene glycol having an epoxide equivalent weight (EEW) of 190, 450 grams of a diglycidyl ether of bisphenol A having an EEW of 188, 252.8 grams of bisphenol A and 96.4 grams of p-nonyl phenol. The contents are heated to 90° C. whereupon 1 gram of ethyltriphenylphosphonium acetate.acetic acid complex catalyst blended with 0.4 gram of methanol is added. The mixture is then heated at 1.5° C./minute to 150° C. whereupon it exotherms to 170° C. and is held there for one hour and then cooled to 130° C. The resultant resin has an EEW of 1648. The resin is cooled. At 70° C., 22.7 grams of propylene glycol methyl ether acetate and 9.3 grams of N-methylethanolamine is added. After one hour, the reaction mixture is cooled to ambient temperature (~23° C.).

Coating dispersion No. 1 is prepared by blending in an agitated reaction vessel 204.5 grams of the amine resin adduct and 133.6 grams of crosslinker A. After heating to 70° C., a solution of 11.2 grams of 72% lactic acid in 50 grams of deionized water is added slowly. After 15 minutes, 4.5 grams of dibutyl tin dilaurate catalyst is added. While continuously stirring, a cationic dispersion is prepared by the slow addition of 1434.2 grams of deionized water to this mixture.

Coating dispersion No. 2 is prepared exactly as coating dispersion No. 1 except propylene glycol phenyl ether was used in place of propylene glycol methyl ether acetate.

C. Preparation of Pigment Grinding Vehicle

A pigment grinding vehicle is prepared by reacting at 70° C., 87.2 grams of a diglycidyl ether of bisphenol A having an EEW of 629 containing 9.6 grams of ethylene glycol n-butyl ether and 10.4 grams of N-methylethanolamine. After one hour, 12.4 grams of lactic acid in 64 grams of water is added. Upon completion of the onium forming reaction, 246.4 grams of water is slowly added while agitating continuously at 60° C.

D. Preparation of Pigment Paste

A pigment paste is prepared by mixing 430 grams of the above prepared pigment grinding vehicle, 342 grams of ASP 200 clay, 62.7 grams of lead silicate, 10.3 grams of carbon black, 139.7 grams of titanium dioxide and 14.3 grams of lead silicon chromate This mixture was blended in a pigment grinding mill.

The pigment paste, 6.8 grams, is added to each 100 grams of the two dispersions prepared in B above. Steel panels pretreated with zinc phosphate are cationically electrocoated in baths of these dispersions at 250 and 300 volts for 2 minutes at a bath temperature of 27° C. After rinsing in deionized water, the wet films are baked at 135° C. for 30 minutes. Film thicknesses are measured and are reported in Table I.

E. Corrosion Test

A Singleton Salt Fog Cabinet operated at conditions specified by "ASTM B117, Standard Method of Salt Spray (Fog) Testing" is used to conduct this test. The specific test conducted is "ASTM D1654-799, Standard Evaluation of Painted or Coated Specimen Subjected to Corrosive Environments". This test entails coating a metal substrate and scribing a large "X" on the panel, through the coating, prior to submitting it to the controlled corrosive environment. The panels are removed weekly and a leg of the "X" was scraped vigorously with a rigid metal spatula while holding the sample under a stream of water. The spatula is held with its face perpendicular to the specimen surface and parallel to the scribe, while moving it back and forth across the scribe to remove the coating that has been undercut and which suffers loss of adhesion. The width of the lost coating is measured and is reported in 64ths of an inch. Results of these evaluations after 500 hours are given in Table I for the panels coated at 250 and 300 volts.

TABLE I

| DISPERSION | FILM THICKNESS (mils/mm) @ 250 V | @ 300 V | CORROSION 64ths Inch Creep |
|---|---|---|---|
| No. 1 | 0.80/0.0203 | 1.11/0.0282 | 3 |
| No. 2* | 0.66/0.0168 | 1.12/0.0284 | 6 |

*Not an example of the present invention.

Dispersion No. 1 which contains a non-isocyanate reactive solvent, propylene glycol methyl ether acetate, shows one-half of the corrosion creep of dispersion No. 2 which contains an isocyanate reactive (hydroxyl group) solvent, propylene glycol phenyl ether.

F. Test To Determine If Coating Is Cured

Uncured coatings are easily wiped off with a paper towel. Cured coatings are evaluated by the solvent double rub technique as follows: To the ball end of a 2 lb. ball pein hammer is attached a pad of cheese cloth composed of 8 plys. The pad is saturated with methyl ethyl ketone (MEK) and then rubbed across a coated substrate. A constant back and forth motion, one double rub, is used allowing only the weight of the hammer to apply force on the coating. This motion is continued until the coating is penetrated to bare metal. Both coatings prepared from dispersions No. 1 and No. 2 gave greater than 200 MEK double rubs.

EXAMPLE 2

A. Preparation of Polyurethane Crosslinker

A polyurethane crosslinker is prepared by blocking 626 grams of a 60% by weight solution of toluene diisocyanate/trimethylolpropane prepolymer (commercially available as SPENKEL TM P49-A6-60 from Spencer Kellogg) in methoxy propyl acetate solvent with 134 grams of methyl ethyl ketoxime. The isocyanate prepolymer is placed in an agitated, closed reaction vessel under a dry nitrogen blanket. A catalyst, 0.62 grams of dibutyl tin dilaurate, is added followed by the slow addition of the methyl ethyl ketoxime. The temperature is maintained below 60° C. After the addition, the product is held at 60° C. for one hour.

B. Preparation of Cationic Electrodeposition Resin Dispersion

Into a closed, agitated reaction vessel are charged 225 grams of a diglycidyl ether of a polyoxypropylene glycol having an epoxide equivalent weight (EEW) of 190, 675 grams of a diglycidyl ether of bisphenol A having an EEW of 188, 397.2 grams of bisphenol A and 144.6 grams of p-nonyl phenol. The contents are heated to 90° C. whereupon 1 gram of ethyltriphenylphosphonium acetate.acetic acid complex catalyst blended with 0.4 gram of methanol is added and the mixture heated at 1.5° C./minute to 150° C. whereupon it exotherms to 170° C. and is held there for one hour and then cooled to 130° C. The resultant resin has an EEW of 1564. Upon the addition of 158 grams of propylene glycol phenyl ether solvent, the mixture continues to cool. At 60° C., 68 grams of N-methylethanolamine is slowly added. After one hour, the reaction mixture is cooled to ambient temperature (~23° C.). The product is resin amine adduct A. A second resin amine adduct, B, is prepared in the same manner except propylene glycol methyl ether acetate is used instead of the propylene glycol phenyl ether solvent.

Coating dispersion No. 1 is prepared by blending at 70° C., 205 grams of the above prepared resin amine adduct B with 158.2 grams of crosslinker prepared in Example 2-A above, 4.7 grams of dibutyl tin dilaurate catalyst and 10.7 grams of lactic acid in 50 grams of deionized water. After blending, 1336.9 grams of deionized water is slowly added while agitating to form the dispersion. To this dispersion is added 134 grams of the pigment paste described in Example 1.

Coating dispersion No. 2 is prepared from the resin amine adduct A by blending, at 70° C., 248.2 grams of the epoxy resin adduct with 186.2 grams of crosslinker prepared in Example 2-A, 5.0 grams of dibutyl tin dilaurate catalyst and 17.2 grams of lactic acid in 50 grams of water. The dispersion is formed by slowly adding 1382.8 grams of water at 70° C. while agitating. This dispersion is not an example of the present invention. The dispersion is pigmented by adding 6.8 grams of the pigment paste described in Example 1 to each 100 grams of the two dispersions.

Both pigmented dispersions are used to cationically electrocoat steel panels pretreated with zinc phosphate in baths of these dispersions at 250 volts for 2 minutes at a bath temperature of 27° C. After rinsing in deionized water, the wet films are baked at 135° C. for 30 minutes. Film thicknesses are measured and are reported in Table II.

Corrosion tests are conducted on the panels coated at 250 volts as described in Example 1-E. Results of the 500 hours evaluations are given in Table II.

TABLE II

| COATING DISPERSION No. | Film Thickness (mils/mm) @ 250 V | Corrosion 64ths Inch Creep |
|---|---|---|
| 1 | 0.85/0.0216 | 1 |
| 2* | 0.56/0.0142 | 72 |

*Not an example of the present invention.

The data in Table II shows that the corrosion is significantly reduced with coating dispersion No. 1 which contains no isocyanate reactive solvent when compared with dispersion No. 2 which contains an isocyanate reactive, hydroxy containing solvent. MEK double rub solvent resistance as described in Example 1-F gives about 70 double rubs for coatings of dispersion No. 1 and greater than 200 double rubs for coatings of dispersion No. 2.

EXAMPLE 3

A. Preparation of Polyurethane Crosslinkers

To a solution of 174 parts of toluene diisocyanate and 43 parts of methoxy propyl acetate at 50° C. is added dropwise a mixture of 33.5 parts of dipropylene glycol and 48 parts of tripropylene glycol. An exothermic reaction raises the temperature to 65° C. and the mixture is allowed to cool to 55° C. upon which 87 parts of methyl ethyl ketoxime is added dropwise. Cooling is applied due to an exothermic reaction. Another 43 parts of methoxy propyl acetate is added and the mixture is heated at 70° C. for 45 minutes longer. The reaction mixture is then cooled to ambient temperature.

B. Preparation of Cationic Electrodeposition Resin.

A cationic electrodeposition resin is prepared in the following manner. Into a 2-liter, round-bottomed flask fitted with a nitrogen inlet, thermometer, mechanical stirrer, and condenser are charged 161.5 grams of an epoxy resin which is the condensation product of bisphenol A and epichlorohydrin having an EEW of 187, 69.1 grams of an epoxy resin which is a condensation product of polypropylene glycol and epichlorohydrin having an EEW of 318, 18 grams of nonyl phenol, and 92.6 grams of bisphenol A. The mixture is stirred in a nitrogen atmosphere and heated to 90° C. to form a clear mixture. A solution of 70 percent by weight of ethyltriphenylphosphonium acetate.acetic acid complex in methanol (5.0 grams) is added and the mixture is heated to 150° C. and is allowed to exotherm. Peak exotherm temperature is controlled to below 200° C. by cooling. The temperature is then maintained at 175° C. until about 60 minutes past peak exotherm when an epoxide equivalent weight of 1640 grams/equivalent is obtained.

This resin is cooled to 130° C. and 13 grams of xylene solvent is added. The resin solution is further cooled to 75° C. and 15.6 grams of N-methylethanolamine is added and allowed to react for one hour at 75° C.

C. Preparation of Dispersions

Dispersion No. 1 is prepared in the following manner. To 244 grams of the cationic electrodeposition resin prepared in Example 3-B above at 60° C., is added 153 grams of polyurethane crosslinker prepared in Example 3-A above and 4.5 grams of dibutyl tin dilaurate catalyst. While agitating continuously, a cationic dispersion is prepared by adding to the resulting mixture at 60° C., 12.8 grams of lactic acid in 72.3 grams of water. After blending well, an additional 1500 grams of water is added slowly to produce a dispersion.

This cationic dispersion is pigmented by blending 125.4 grams of the pigment paste prepared in Example 1-D with the dispersion.

Dispersion No. 2 is prepared in like manner as dispersion No. 1 with the addition of 11.5 grams of n-butanol and 10.1 grams of DuPont Dibasic Ester solvent added after the N-methylethanolamine reaction.

These dispersions are electrodeposited and baked as described in Example 1. The resulting film thicknesses are measured and reported in Table III. The coatings are applied at 200, 250 and 300 volts.

Two commercial cathodic electrodeposition primers, ED 3002 and ED 3150, marketed by PPG Industries, Inc., are electrodeposited onto zinc phosphate pretreated steel panels at 200, 250 and 300 volts for two minutes in baths at 82° F. (27° C.). These wet films are baked at 350° F. (176° C.) for 30 minutes. These high temperature cured systems are used in comparison evaluations.

All four sets of CED coated panels are smooth and of similar appearance. Coating thicknesses are measured for panels coated at the three voltages using an electronic thickness gauge. Corrosion tests are conducted on the panels coated at 250 volts as described in Example 1-E. Results are reported in Table III.

TABLE III

| | COATING PERFORMANCES | | | |
|---|---|---|---|---|
| COATING DISPERSIONS | COATING THICKNESS 200 Volts MILS (MM) | COATING THICKNESS 250 Volts MILS (MM) | COATING THICKNESS 300 Volts MILS (MM) | CORROSION TEST 64ths Inches Creep |
| Dispersion No. 1 | 0.41 (0.0104) | 0.50 (0.0127) | 0.57 (0.145) | 2 |
| Dispersion No. 2* | 0.68 (0.0173) | 0.83 (0.0211) | (—) | 10 |
| ED3002*[1] | 0.57 (0.0145) | 0.63 (0.0160) | 0.67 (0.0170) | 1 |
| ED3150*[1] | 0.71 (0.0180) | 1.20 (0.0305) | 1.7 (0.0432) | 1 |

*Not an example of the present invention.
[1] A commercial system

Of the two low temperature cured systems Dispersion No. 1, an example of the present invention since it contained no reactive solvents, no butanol, gave corrosion performance only slightly worse than the commercial high temperature systems. Dispersion No. 2, which contained n-butanol, a hydroxyl functional compound, shows a ten fold poorer corrosion performance as compared to the commercial systems.

EXAMPLE 4

Two polyurethane crosslinkers are prepared using the procedure of Example 1-A. The components employed are given in the following Table IV.

TABLE IV

| COMPONENTS | CROSSLINKER J pbw | CROSSLINKER K pbw |
|---|---|---|
| TOLUENE diisocyanate | 104.9 | 75.7 |
| Polyether polyol | 40.2[a] | 92.5[b] |
| Blocking agent[c] | 52.2 | 37.9 |
| catalyst | 0.36 | 0.23 |
| solvent[d] | 49.1 | 51.4 |

[a] The polyol is dipropylene glycol.
[b] The polyol is polyoxypropylene glycol having a number average molecular weight of 425.
[c] The blocking agent is methyl ethyl ketoxime.
[d] The solvent is propylene glycol methyl ether acetate.

An epoxy resin having an EEW of 1687 is prepared as described in Example 2 employing 596 grams of a diglycidyl ether of a polyoxypropylene glycol having an EEW of 320, 1389 grams of a diglycidyl ether of bisphenol A having an EEW of 188, 711.8 grams of bisphenol A, 305.6 grams of p-nonyl phenol, 4.1 grams of ethyltriphenylphosphonium acetate.acetic acid complex catalyst in 1.7 grams of methanol, and 156.9 grams of xylene. This resin is then reacted with 132.6 grams of N-methylethanolamine as described in Example 1-B.

Five dispersions are prepared as described in Eample 1-B employing the components listed in Table V.

TABLE V

| COMPONENT | 0% Crosslinker K* | 25% Crosslinker K* | 50% Crosslinker K* | 75% Crosslinker K* | 100% Crosslinker K* |
|---|---|---|---|---|---|
| Resin-Amine, g | 283.6 | 278.4 | 270.0 | 270.0 | 270.0 |
| Crosslinker J, g | 91.5 | 67.3 | 43.5 | 21.8 | 0.00 |
| Crosslinker K | 0.0 | 32.4 | 62.8 | 94.2 | 125.6 |
| Propylene glycol methyl ether acetate, g | 5.9 | 4.3 | 2.9 | 1.4 | 0.0 |
| xylene, g | 0.0 | 0.3 | 0.5 | 0.8 | 1.2 |
| Dibutyl tin dilaurate, g | 5.2 | 5.3 | 5.3 | 5.4 | 5.5 |
| Lactic Acid, g | 8.5 | 8.3 | 8.1 | 8.1 | 8.1 |
| Water, g | 1597.8 | 1604.9 | 1591.4 | 1626.1 | 1660.7 |

*% by weight based on combined weight of crosslinkers J and K.

The dispersions of Table V are pigmented by blending 6.3 grams of the pigment paste of Example 1-D per 100 grams of each of the five dispersions. Coatings are applied by electrodeposition as described in Example 1 and are cured by baking at 135° C. for 30 minutes. The resulting film thicknesses are measured and reported in Table VI.

Corrosion tests are conducted on the panels coated at 250 volts as described in Example 1-E. Results of the evaluations after 500 hours of exposure are given in Table VI as well as the ASTM D3363-74, "Pencil Hardness Test" results, used to determine that the coatings are cured, are given in Table VI. A pencil test value of at least 1H shows that the coating is cured.

TABLE VI

| % Crosslinker K* | Film Thickness (mils/mm) @ 250 V | Film Thickness (mils/mm) @ 300 V | Corrosion Test 64th Inch Creep | Pencil Hardness |
|---|---|---|---|---|
| 0 | .61/.0155 | .61/.0155 | 3 | 4H |

TABLE VI-continued

| % Cross-linker K* | Film Thickness (mils/mm) @ 250 V | Film Thickness (mils/mm) @ 300 V | Corrosion Test 64th Inch Creep | Pencil Hardness |
|---|---|---|---|---|
| 25 | .61/.0155 | .69/.0175 | 4 | 5H |
| 50 | .62/.0158 | .72/.0174 | 2 | 4H |
| 75 | .69/.0175 | .69/.0175 | 2 | 6H |
| 100 | .76/.0254 | .84/.0213 | 2 | 5H |

*% by weight based on combined weight of crosslinkers J and K.

The data in Table VI shows that the film thickness generally increases as the portion of the polyether polyol component (crosslinker K) in the coating increases. The corrosion performance is excellent for all five coatings which were formulated with non-isocyanate reactive solvents.

EXAMPLE 5

A. Preparation of Polyurethane Crosslinkers

To 459.5 parts of toluene diisocyanate at 60° C. is added dropwise a mixture of 88.5 parts of dipropylene glycol and 126.8 parts of tripropylene glycol. After the glycol addition, 159.6 parts of cyclohexanone solvent is added and the mixture is heated to 68° C. Next 229.8 parts of methyl ethyl ketoxime is added dropwise while holding the temperature between 60° C. and 70° C. Cooling is applied due to an exothermic reaction. The mixture is heated at 70° C. for one hour longer. After pouring, the reaction mixture is cooled to ambient temperature.

B. Preparation of Cationic Electrodeposition Resin.

A cationic electrodeposition resin is prepared in the following manner. Into a 5-liter, round-bottomed flask fitted with a nitrogen inlet, thermometer, mechanical stirrer, and condenser are charged 1269 grams of an epoxy resin which is the condensation product of bisphenol A and epichlorohydrin having an EEW of 187, 543.8 grams of an epoxy resin which is a condensation product of polypropylene glycol and eiichlorohydrin having an EEW of 318, 278.6 grams of nonyl phenol, and 642.9 grams of bisphenol A. The mixture is stirred in a nitrogen atmosphere and heated to 90° C. to form a clear mixture. A solution of 70 percent by weight of ethyltriphenylphosphonium acetate.acetic acid complex in methanol (5.22 grams) is added and the mixture is heated to 150° C. and is allowed to exotherm. Peak exotherm temperature is controlled to below 200° C. by cooling. The temperature is then maintained at 175° C. until about 170 minutes past peak exotherm when an epoxide equivalent weight of 1686 grams/equivalent is obtained.

This resin is cooled to 130° C. and 143.5 grams of xylene solvent is added. The resin solution is further cooled to 85° C. and 121.4 grams of N-methylethanolamine is added and allowed to react for one hour at 95° C.

C. Preparation of Dispersion

The dispersion is prepared in the following manner. To 227.8 grams of the cationic electrodeposition resin prepared in Example 5-B above at 76° C., is added 132.3 grams of polyurethane crosslinker prepared in Example 5-A above and 4.6 grams of dibutyltin dilaurate catalyst. While agitating continuously, a cationic dispersion is prepared by adding to the resulting mixture at 65° C., 8.5 grams of lactic acid in 26.1 grams of water. After blending well, an additional 1198 grams of water is added slowly to produce a dispersion.

D. Preparation of Pigment Grinding Vehicle

A pigment grinding vehicle is prepared by reacting at 65° C., 1220.3 grams of a diglycidyl ether of bisphenol A having an EEW of 537 containing 305.1 grams of methyl ethyl ketone and 170.5 grams of N-methylethanolamine. After one hour at 80° C., 204.3 grams of lactic acid in 64 grams of water is added. Upon completion of the onium forming reaction, 2023.6 grams of water is slowly added while agitating continuously at 50° C.

E. Preparation of Pigment Paste

A pigment paste is prepared by mixing 1396 grams of the above prepared pigment grinding vehicle, 216.6 grams of ASP 200 clay, 83.8 grams of lead silicate, 29.4 grams of carbon black, 1074 grams of titanium dioxide and 186 grams of water. This mixture is blended in a pigment grinding mill.

The pigment paste, 9.5 grams, is added to each 100 grams of the dispersion prepared in C above. Steel panels pretreated with zinc phosphate are cationically electrocoated in baths of the dispersions at 200, 225, 250, 275 and 300 volts for 2 minutes at a bath temperature of 27° C. After rinsing in deionized water, the wet films are baked at 135° C. for 30 minutes. Film thicknesses are measured and are reported in Table VII.

TABLE VII

| Deposition Voltages | 200 V | 225 V | 250 V | 275 V | 300 V |
|---|---|---|---|---|---|
| Film Thickness | | | | | |
| mils | 0.635 | 0.678 | 0.726 | 0.786 | 0.864 |
| mm | 0.0161 | 0.0172 | 0.0184 | 0.0200 | 0.0219 |

Corrosion tests are conducted on the panel coated at 250 volts as described in Example 1-E. Results of the 500 hours evaluation show a corrosion creep of 2/64ths of an inch.

F. Test To Determine If Coating Is Cured

Cured coatings are evaluated as described in Example 1-F by the solvent double rub technique. The solvent used is methyl isobutyl ketone instead of methyl ethyl ketone as described in Example 1-F and the double rubs are continued until a permanent mar (blemish) is detected. These coatings gave over 20 double rubs.

EXAMPLE 6

A. Preparation of Polyurethane Crosslinkers

To 429.1 parts of toluene diisocyanate at 50° C. is added dropwise a mixture of 40.5 parts of dipropylene glycol and 43.5 parts of tripropylene glycol. The exothermic reaction temperature is controlled at 50° C., 150 parts of cyclohexanone solvent is added and the mixture heated to 50° C. whereupon 336.9 parts of methyl ethyl ketoxime is added dropwise. Cooling is applied due to an exothermic reaction. The mixture is held at 60° C. for 50 minutes longer. The reaction mixture is then cooled to ambient temperature.

B. Preparation of Cationic Electrodeposition Resin.

The cationic electrodeposition resin is prepared as described in Example 5-B. The resulting epoxy equivalent weight is 1660 grams/equivalent: therefore, 123.4 grams of N-methylethanolamine is reacted with the epoxide resin to prepare the amine adduct.

C. Preparation of Dispersion

The dispersion is prepared in the following manner. To 258.8 grams of the cationic electrodeposition resin prepared in Example 6-B above at 73° C., is added 74.2 grams of polyurethane crosslinker prepared in Example 6-A above and 4.3 grams of dibutyl tin dilaurate catalyst. While agitating continuously, 6.4 grams of Eastman Chemicals C-11 ketone solvent is added. A cationic dispersion is prepared by adding to the resulting mixture at 70° C., 9.10 grams of lactic acid in 27.3 grams of water. After blending well, an additional 1415 grams of water is added slowly to produce a dispersion.

This cationic dispersion is pigmented by blending 9.5 grams of the pigment paste prepared in Example 5-E with each 100 grams of the dispersion. The pigmented dispersion is used to cationically electrocoat steel panels pretreated with zinc phosphate in baths of the dispersion at 225, 250 and 275 volts for 2 minutes at a bath temperature of 27° C. After rinsing in deionized water, the wet films are baked at 121° C. for 30 minutes. Film thicknesses are measured and are reported in Table VIII.

TABLE VIII

| Deposition Voltages | 225 V | 250 V | 275 V |
|---|---|---|---|
| Film Thickness | | | |
| mils | 0.81 | 0.90 | 1.10 |
| mm | 0.0206 | 0.0229 | 0.0279 |

Corrosion tests are conducted on the panel coated at 250 volts as described in Example 1-E. Results of the 500 hours evaluation show a corrosion creep of 4/64ths of an inch.

These coatings are evaluated by the solvent double rub technique described in Example 5-F. These coatings gave 20 double rubs.

EXAMPLE 7

A. Preparation of Polyurethane Crosslinkers

A polyurethane crosslinker is prepared by blocking 232.8 grams of diphenyl methane diisocyanate (MDI) prepolymer (commercially available as ISONATE TM 181 from The Dow Chemical Company) in 57.6 grams of cyclohexanone solvent with 93.9 grams of acetone oxime. The isocyanate prepolymer is placed in an agitated, closed reaction vessel under a dry nitrogen blanket. A catalyst, 0.10 grams of dibutyl tin dilaurate, is added followed by the slow addition of acetone oxime. The temperature is maintained below 70° C. After the addition, the product is held at 70° C. for one hour.

B. Preparation of Cationic Electrodeposition Resin Dispersion

A portion of the cationic electrodeposition resin prepared in Example 6-B is used in this example.

C. Preparation of Dispersion

A coating dispersion is prepared by blending at 70° C., 247.5 grams of the resin amine adduct prepared in Example 6-B with 73.2 grams of crosslinker prepared in Example 7-A above and 4.7 grams of dibutyl tin dilaurate catalyst, and 8.2 grams of lactic acid in 25 grams of deionized water. After blending, 1364.7 grams of deionized water is slowly added while agitating to form the dispersion.

This cationic dispersion is pigmented by blending 164 grams of the pigment paste described in Example 5-E.

The pigmented dispersion is used to cationically electrocoat steel panels pretreated with zinc phosphate in baths of the dispersion at 225, 250, 275, and 300 volts for 2 minutes at a bath temperature of 27° C. After rinsing in deionized water, the wet films are baked at 121° C. or 135° C. for 30 minutes. Film thicknesses are measured and are reported in Table IX.

TABLE IX

| Deposition Voltages | 225 V | 250 V | 275 V | 300 V |
|---|---|---|---|---|
| Film Thickness | | | | |
| mils | 0.67 | 0.72 | 0.77 | 0.83 |
| mm | 0.0170 | 0.0183 | 0.0196 | 0.0211 |

Corrosion tests are conducted on the panel coated at 250 volts and baked at 121° C. and 135° C. as described in Example 1-E. Results of the 500 hours evaluation gave a corrosion creep of 3/64ths of an inch in each instance.

These coatings are evaluated by the solvent double rub technique described in Example 6-F. These coatings gave 20 double rubs.

EXAMPLE 8

A. Preparation of Polyurethane Crosslinkers

To a solution of 352 parts of toluene diisocyanate, 122 parts of cyclohexanone solvent and 1 gram of dibutyl tin dilaurate catalyst is added dropwise a mixture of 67.7 parts of dipropylene glycol and 97.5 parts of tripropylene glycol. An exothermic reaction raises the temperature to 50° C. where it is maintained by cooling during the addition. Then 147.9 parts of acetone oxime is added slowly. Cooling is applied due to an exothermic reaction. The mixture is heated at 70° C. for 60 minutes longer. The reaction mixture is then cooled to ambient temperature.

B. Preparation of Cationic Electrodeposition Resin Dispersion

The cationic electrodeposition resin is prepared as described in Example 5-B. The resulting equivalent weight is 1693 grams/equivalent; therefore, 120.8 grams of N-methylethanolamine is reacted with the epoxide resin to prepare the amine adduct.

C. Preparation of Dispersion

A coating dispersion is prepared by blending at 70° C., 205.2 grams of the resin amine adduct prepared in Example 8-B with 119.6 grams of crosslinker prepared in Example 8-A above, 4.1 grams 4.7 grams of dibutyl tin dilaurate catalyst, and 6.2 grams of Eastman Chemical Co. C-11 ketone solvent. While agitating continuously, a cationic dispersion is prepared by adding to the resulting mixture at 72° C., 7.9 grams of lactic acid in 24.5 grams of water. After blending well, an additional 994.7 grams of water is slowly added to produce a dispersion.

This cationic dispersion is pigmented by blending 112.9 grams of the pigment paste described in Example 5-E with the dispersion.

The pigmented dispersion is used to cationically electrocoat steel panels pretreated with zinc phosphate in baths of the dispersion at 200, 225, 250, 275, and 300 volts for 2 minutes at a bath temperature of 27° C. After rinsing in deionized water, the wet films are baked at 121° C. or 135° C. for 30 minutes. Film thicknesses are measured and are reported in Table X.

TABLE X

| Deposition Voltages | 200 V | 225 V | 250 V | 275 V | 300 V |
|---|---|---|---|---|---|
| Film Thickness | | | | | |
| mils | 0.61 | 0.68 | 0.72 | 0.79 | 0.85 |
| mm | 0.0155 | 0.0173 | 0.0183 | 0.0201 | 0.0216 |

Corrosion tests are conducted on the panel coated at 250 volts and baked at 121° C. and 135° C. as described in Example 1-E. Results of the 500 hours evaluation gave a corrosion creep of 3/64ths of an inch in each instance.

These coatings are evaluated by the solvent double rub technique described in Example 6-F. These coatings gave 50 double rubs.

EXAMPLE 9

A. Preparation of Polyurethane Crosslinkers

To a solution of 238 parts of toluene diisocyanate, 1.2 grams of dibutyl tin dilaurate catalyst and 126.1 parts of diisobutyl ketone solvent at 50° C. is added dropwise a mixture of 45.8 parts of dipropylene glycol and 65.4 parts of tripropylene glycol. An exothermic reaction occurs and the mixture is cooled to maintain the temperature at 50° C. during the addition. Next, 154.8 parts of cyclohexanone oxime is added slowly. Cooling is applied due to the exothermic reaction to maintain the temperature at 50° C. during the addition. Then the mixture is held at 70° C. for 60 minutes. The reaction mixture is then cooled to ambient temperature.

B. Preparation of Cationic Electrodeposition Resin Dispersion

A portion of the resin amine adduct from Example 8-B is used to prepare this dispersion.

The dispersion is prepared by blending at 75° C., 203.1 grams of the resin amine adduct prepared in Example 8-B with 125.8 grams of crosslinker prepared in Example 9-A above and 4 grams of dibutyl tin dilaurate catalyst While agitating continuously, a cationic dispersion is prepared by adding to the resulting mixture at 78° C., 7.9 grams of lactic acid in 25.1 grams of water. After blending well, an additional 1152.6 grams of water is slowly added to produce a dispersion.

This cationic dispersion is pigmented by blending 144.3 grams of the pigment paste described in Example 5-E with the dispersion.

The pigmented dispersion is used to cationically electrocoat steel panels pretreated with zinc phosphate in baths of the dispersion at 200, 225, 250, and 275 volts for 2 minutes at a bath temperature of 27° C. After rinsing in deionized water, the wet films are baked at 121° C., 135° C. or 150° C. for 30 minutes. Film thicknesses are measured and are reported in Table XI.

TABLE XI

| Deposition Voltages | 200 V | 225 V | 250 V | 275 V |
|---|---|---|---|---|
| Film Thickness | | | | |
| mils | 0.63 | 0.71 | 0.79 | 1.005 |
| mm | 0.0160 | 0.0180 | 0.0201 | 0.02555 |

Corrosion tests are conducted on the panel coated at 250 volts as described in Example 1-E. Results of the 500 hours evaluation are given in Table XII.

TABLE XII

| Bake Temp. °C. | Corrosion Test 64th Inch Creep |
|---|---|
| 121 | 4 |
| 135 | 4 |
| 150 | 3 |

These coatings are evaluated by the solvent double rub technique described in Example 6-F. These coatings gave 20 double rubs.

EXAMPLE 10

A. Preparation of Epoxy Resins

Epoxy Resin A is prepared as described in U.S. Pat. No. 4,419,467, Example B as follows: Into a closed, agitated reaction vessel are charged 152.4 grams of a diglycidyl ether of bisphenol A having an epoxy equivalent weight of 188 and 52.8 grams of Synfac 8009 (an adduct of bisphenol A and ethylene oxide in a molar ratio of 1 to 6, respectively manufactured by Milliken Chemical Co.). The vessel is heated to 120° C. under dry nitrogen purge and 12.9 grams of xylene are added. The vessel is then heated to 210° C. for 45 minutes with increased nitrogen flow. Into an overhead condenser is collected 9.1 grams of condensate. The vessel is cooled to 145° C. and 42.5 grams of bisphenol A and 0.35 grams of benzyl dimethyl amine are added and then the vessel is heated to 150° C. whereupon it exotherms to 176° C. It is cooled to 130° C. within 20 minutes and 0.47 grams of benzyl dimethyl amine is added. After two hours at 130° C., the sample is cooled. The epoxy equivalent weight is 964.

Epoxy Resin B is prepared as follows: Into a closed, agitated reaction vessel is charged 750.4 grams of a diglycidyl ether of a polyoxypropylene glycol having an epoxide equivalent weight (EEW) of 320, 1750.7 grams of a diglycidyl ether of bisphenol A having an EEW of 188, and 998.9 grams of bisphenol A. The contents are heated to 90° C. whereupon 5.1 grams of ethyltriphenylphosphonium acetate.acetic acid complex catalyst blended with 2.18 grams of methanol is added and the mixture heated at 1.5° C./minute to 150° C. whereupon it exotherms to 175° C. and is held there for one hour and then cooled to ambient temperature. The resultant resin has an EEW of 1186.

Epoxy Resin C is prepared as follows: Into a closed, agitated reaction vessel are charged 6908 grams of a diglycidyl ether of a polyoxypropylene glycol having an epoxy equivalent weight (EEW) of 320, 16,149 grams of a diglycidyl ether of bisphenol A having an EEW of 188, 9256 grams of bisphenol A and 1801 grams of p-nonyl phenol. The contents are heated to 90° C. whereupon 48 grams of ethyltriphenylphosphonium acetate.acetic acid complex catalyst blended with 19.3 grams of methanol is added and the mixture heated at 1.5° C./minute to 150° C. whereupon it exotherms to 175° C. and is held there for one hour and then cooled to ambient temperature. The resultant resin has an EEW of 1622.

B. Viscosity Measurements

Brookfield viscosity measurements are made on a Brookfield RVTD digital viscometer using a #27 spindle. Samples are heated in a microprocessor (Model 84 Programmable Temperature Controller) controlled Brookfield Thermosel. A spindle speed of 0.5 RPM (lowest shear rate possible) is employed as being most representative of the shear condition during flow of a coating on a vertical panel. The starting temperature is chosen as the lowest temperature (about 85° C.) that will bring the viscometer on scale. After equilibrating for 20 min. the temperature is increased by 5° C. and held for 20 min. Thereafter, the temperature is increased in 10° C. increments with 20 minute equilibration at each temperature before making a measurement.

When the viscosity drops to the point that the digital readout approaches 10, the RPM is increased to 1.0 RPM to maintain the accuracy of the readout. Before making the change the viscosities at both shear rates are compared to make sure the resin is Newtonian.

The viscosities of epoxy resins A, B and C reported at a temperature between 85° C. and 110° C. in Table VII demonstrate the effects of lowering the viscosities by incorporating diglycidyl ethers of polypropylene glycols and phenolic capping of the resins. One might predict higher viscosities for higher EEW's. The lower viscosity resins are useful in low temperature cured cathodic electrodeposited coatings because they aid coalescence and film flow during baking without the need for higher volatile solvent contents.

TABLE XIII

| Temp. °C. | Viscosities (Centipoise) Resin A | Viscosities (Centipoise) Resin B | Viscosities (Centipoise) Resin C |
|---|---|---|---|
| 85 | 419,000 | 313,000 | 245,500 |
| 90 | 285,500 | 177,500 | 126,750 |
| 100 | 128,500 | 68,750 | 47,250 |
| 110 | 76,000 | 27,750 | 21,250 |
| EEW | 964 | 1186 | 1622 |

What is claimed is:

1. In a cathodic electrodepositable coating composition comprising an aqueous dispersion of (1) at least one cationic epoxy-based resin, (2) at least one blocked isocyanate crosslinker, and (3) a solvent system containing one or more organic solvents:
   the improvement which comprises (a) employing a blocked isocyanate crosslinker which deblocks at a temperature of less than about 160° C., and (b) employing as the solvent system, one which is substantially free of any organic solvent which will react with isocyanate groups at the temperature employed to cure said coating.

2. A cathodic electrodepositable coating composition of claim 1 wherein (a) an oxime blocked isocyanate crosslinker which deblocks at a temperature of between about 100° C. and about 155° C. is employed, and (b) said solvent system which is substantially free of any organic solvent which will react with isocyanate groups contains aromatic hydrocarbon(s), aliphatic hydrocarbon(s), glycol ether ester(s), ester(s), ketone(s), ether(s) or any combination thereof.

3. A cathodic electrodepositable coating composition of claim 2 wherein the blocked isocyanate is a ketoxime blocked isocyanate.

4. A cathodic electrodepositable coating composition of claim 3 wherein (a) at least a portion of said oxime blocked isocyanate crosslinker is an oxime blocked isocyanate-containing prepolymer wherein said isocyanate-containing prepolymer is the reaction product of a polyisocyanate and a polyether polyol and (b) said solvent system which is substantially free of any organic solvent which will react with isocyanate groups is selected from the group consisting of aromatic hydrocarbon(s), aliphatic hydrocarbon(s), ketone(s) and any combination thereof.

5. A cathodic electrodepositable coating composition of claim 4 wherein (a) said oxime blocked isocyanate crosslinker is an isocyanate terminated prepolymer prepared from toluene diisocyante and a polyoxypropylene glycol having a number average molecular weight of from about 130 to about 500 which has been blocked with acetone oxime, methyl ethyl ketoxime, cyclohexanone oxime or any combination thereof: and (b) said solvent system which is substantially free of any organic solvent which will react with isocyanate groups contains xylene, cyclohexanone or any combination thereof.

6. A cathodic electrodepositable coating composition of claim 1, 2, 3, 4 or 5 wherein said epoxy-based resin is based on an advanced epoxy resin prepared by reacting a diglycidyl ether of bisphenol A having an EEW of from about 175 to about 250 with bisphenol A.

7. A cathodic electrodepositable coating composition of claim 1, 2, 3, 4 or 5 wherein said epoxy-based resin is based on a mixture of an advanced epoxy resin prepared by reacting a diglycidyl ether of bisphenol A having an EEW of from about 175 to about 250 with bisphenol A and an advanced epoxy resin prepared by reacting a diglycidyl ether of a compound having two aliphatic hydroxyl groups per molecule with bisphenol A.

8. A cathodic electrodepositable coating composition of claim 1, 2, 3, 4 or 5 wherein said epoxy resin is based on an advanced epoxy resin prepared by reacting a diglycidyl ether of bisphenol A having an EEW of from about 175 to about 250 and a diglycidyl ether of a compound having two aliphatic hydroxyl groups per molecule with bisphenol A.

9. A cathodic electrodepositable coating composition of claim 7 wherein said epoxy resin is partially capped with a monofunctional phenolic compound in an amount such that up to about 0.7 equivalents of capping agent is employed per epoxy equivalent contained in the epoxy resin before capping.

10. A cathodic electrodepositable coating composition of claim 8 wherein said epoxy resin is partially capped with a monofunctional phenolic compound in an amount such that up to about 0.7 equivalents of capping agent is employed per epoxy equivalent contained in the epoxy resin before capping.

11. A cathodic electrodepositable coating composition of claim 7 wherein said diglycidyl ether of a compound having two aliphatic hydroxyl groups per molecule is a diglycidyl ether of a polyoxypropylene glycol having an EEW of from about 180 to about 400.

12. A cathodic electrodepositable coating composition of claim 8 wherein said diglycidyl ether of a compound having two aliphatic hydroxyl groups per molecule is a diglycidyl ether of a polyoxypropylene glycol having an EEW of from about 180 to about 400.

13. A cathodic electrodepositable coating composition of claim 9 wherein said diglycidyl ether of a compound having two aliphatic hydroxyl groups per molecule is a diglycidyl ether of a polyoxypropylene glycol having an EEW of from about 180 to about 400.

14. A cathodic electrodepositable coating composition of claim 10 wherein said diglycidyl ether of a compound having two aliphatic hydroxyl groups per molecule is a diglycidyl ether of a polyoxypropylene glycol having an EEW of from about 180 to about 400.

15. A method of coating a composition containing a blocked isocyanate crosslinker, a solvent system containing one or more organic solvents, and a cationic, epoxy resin-based composition onto an object having an electroconductive surface by the steps comprising
  (1) immersing the electroconductive object into a coating bath comprising an aqueous dispersion of cationic particles of the epoxy resin-based composition, a blocked isocyanate crosslinker and solvent system containing one or more organic solvents;
  (2) passing an electric current through said bath sufficient to electrodeposit a coating of said composition onto the object by providing a difference in electrical potential between the object and an electrode that is
    (a) spaced apart from said object;
    (b) in electrical contact with said bath; and
    (c) electrically positive in relation to said object;
the improvement which comprises employing (a) as the blocked isocyanate crosslinker, a blocked isocyanate crosslinker which deblocks at a temperature below about 160° C., and (b) as the organic solvent system, one which is substantially free of any organic solvent which will react with isocyanate groups at the temperature employed to cure said coating.

16. A method of claim 15 wherein (a) an oxime blocked isocyanate crosslinker which deblocks at a temperature of between about 100° C. and about 155° C. is employed, and (b) said solvent system which is substantially free of any organic solvent which will react with isocyanate groups contains aromatic hydrocarbon(s), aliphatic hydrocarbon(s), glycol ether ester(s), ester(s), ketone(s), ether(s) or any combination thereof.

17. A method of claim 16 wherein the blocked isocyanate is a ketoxime blocked isocyanate.

18. A method of claim 17 wherein (a) at least a portion of said oxime blocked isocyanate crosslinker is oxime blocked isocyanate-containing prepolymer wherein said isocyanate-containing prepolymer is the reaction product of a polyisocyanate and a polyether polyol and (b) said solvent system which is substantially free of any organic solvent which will react with isocyanate groups is selected from the group consisting of aromatic hydrocarbon(s), aliphatic hydrocarbon(s), ketone(s) and any combination thereof.

19. A method of claim 18 wherein (a) said oxime blocked isocyanate crosslinker is an isocyanate terminated prepolymer prepared from toluene diisocyante and a polyoxypropylene glycol having a number average molecular weight of from about 130 to about 500 which has been blocked with acetone oxime, methyl ethyl ketoxime, cyclohexanone oxime or any combination thereof; and (b) said solvent system which is substantially free of any organic solvent which will react with isocyanate groups contains xylene, cyclohexanone or any combination thereof.

20. A method of claim 15, 16, 17, 18 or 19 wherein said epoxy-based resin is based on an advanced epoxy resin prepared by reacting a diglycidyl ether of bisphenol A having an EEW of from about 175 to about 250 with bisphenol A.

21. A method of claim 15, 16, 17, 18 or 19 wherein said epoxy-based resin is based on a mixture of an advanced epoxy resin prepared by reacting a diglycidyl ether of bisphenol A having an EEW of from about 175 to about 250 with bisphenol A and an advanced epoxy resin prepared by reacting a diglycidyl ether of a compound having two aliphatic hydroxyl groups per molecule with bisphenol A.

22. A method of claim 15, 16, 17, 18 or 19 wherein said epoxy resin is based on an advanced epoxy resin prepared by reacting a diglycidyl ether of bisphenol A having an EEW of from about 175 to about 250 and a diglycidyl ether of a compound having two aliphatic hydroxyl groups per molecule with bisphenol A.

23. A method of claim 21 wherein said epoxy resin is partially capped with a monofunctional phenolic compound in an amount such that up to about 0.7 equivalents of capping agent is employed per epoxy equivalent contained in the epoxy resin before capping.

24. A method of claim 22 wherein said epoxy resin is partially capped with a monofunctional phenolic compound in an amount such that up to about 0.7 equivalents of capping agent is employed per epoxy equivalent contained in the epoxy resin before capping.

25. A method of claim 21 wherein said diglycidyl ether of a compound having two aliphatic hydroxyl groups per molecule is a diglycidyl ether of a polyoxypropylene glycol having an EEW of from about 180 to about 400.

26. A method of claim 22 wherein said diglycidyl ether of a compound having two aliphatic hydroxyl groups per molecule is a diglycidyl ether of a polyoxypropylene glycol having an EEW of from about 180 to about 400.

27. A method of claim 23 wherein said diglycidyl ether of a compound having two aliphatic hydroxyl groups per molecule is a diglycidyl ether of a polyoxypropylene glycol having an EEW of from about 180 to about 400.

28. A method of claim 24 wherein said diglycidyl ether of a compound having two aliphatic hydroxyl groups per molecule is a diglycidyl ether of a polyoxypropylene glycol having an EEW of from about 180 to about 400.

29. A method of claim 15, 16, 17, 18 or 19 wherein a catalyst is employed to accelerate curing of the coating.

30. A method of claim 20 wherein a catalyst is employed to accelerate curing of the coating.

31. A method of claim 21 wherein a catalyst is employed to accelerate curing of the coating.

32. A method of claim 22 wherein a catalyst is employed to accelerate curing of the coating.

33. A method of claim 23 wherein a catalyst is employed to accelerate curing of the coating.

34. A method of claim 24 wherein a catalyst is employed to accelerate curing of the coating.

35. A method of claim 25 wherein a catalyst is employed to accelerate curing of the coating.

36. A method of claim 26 wherein a catalyst is employed to accelerate curing of the coating.

37. A method of claim 27 wherein a catalyst is employed to accelerate curing of the coating.

38. A method of claim 28 wherein a catalyst is employed to accelerate curing of the coating.

39. A method of claim 15, 16, 17, 18 or 19 where said coating bath contains from about 60 to about 95 percent water by weight.

40. A method of claim 20 where said coating bath contains from about 60 to about 95 percent water by weight.

41. A method of claim 21 where said coating bath contains from about 60 to about 95 percent water by weight.

42. A method of claim 22 where said coating bath contains from about 60 to about 95 percent water by weight.

43. A method of claim 23 where said coating bath contains from about 60 to about 95 percent water by weight.

44. A method of claim 24 where said coating bath contains from about 60 to about 95 percent water by weight.

45. A method of claim 25 where said coating bath contains from about 60 to about 95 percent water by weight.

46. A method of claim 26 where said coating bath contains from about 60 to about 95 percent water by weight.

47. A method of claim 27 where said coating bath contains from about 60 to about 95 percent water by weight.

48. A method of claim 28 where said coating bath contains from about 60 to about 95 percent water by weight.

* * * * *